United States Patent [19]
Davidov et al.

[11] Patent Number: 5,377,232
[45] Date of Patent: Dec. 27, 1994

[54] FREQUENCY SYNCHRONIZED BIDIRECTIONAL RADIO SYSTEM

[75] Inventors: Mircho A. Davidov, Alamo; Forrest F. Fulton, Los Altos, both of Calif.

[73] Assignee: CellNet Data Systems, Inc., San Carlos, Calif.

[21] Appl. No.: 818,693

[22] Filed: Jan. 9, 1992

[51] Int. Cl.⁵ .................................................. H04L 7/00
[52] U.S. Cl. .................................... 375/106; 375/80; 375/107; 375/109; 370/100.1
[58] Field of Search ............. 375/107, 120, 42, 39, 375/80, 109, 118, 81, 106; 455/51, 75, 76; 370/104.1, 100.1, 85.8, 95.2, 105.4, 110.1

[56] References Cited

U.S. PATENT DOCUMENTS

| | | |
|---|---|---|
| 2,757,279 | 7/1956 | Vosburgh . |
| 3,931,575 | 1/1976 | Amaroso . |
| 4,451,930 | 5/1984 | Chapman et al. . |
| 4,489,413 | 12/1984 | Richmond et al. . |
| 4,513,447 | 4/1985 | Carson . |
| 4,532,635 | 7/1985 | Mangulis ........................ 375/1 |
| 4,587,661 | 5/1986 | Schiff ........................ 370/104.1 |
| 4,590,602 | 5/1986 | Wolaver ........................ 375/82 |
| 4,631,738 | 12/1986 | Betts et al. ................... 375/98 |
| 4,651,330 | 3/1987 | Ballance ........................ 375/109 |
| 4,703,520 | 10/1987 | Rozanski . |
| 4,727,333 | 2/1988 | Dieterich ........................ 375/25 |
| 4,993,048 | 2/1991 | Williams et al. ............... 375/97 |
| 5,003,559 | 3/1991 | Kanai et al. .................... 375/109 |
| 5,187,719 | 2/1993 | Birgenheier et al. ........... 375/10 |
| 5,216,717 | 6/1993 | Bourcet et al. ................. 375/107 |

*Primary Examiner*—Stephen Chin
*Assistant Examiner*—Don Vo
*Attorney, Agent, or Firm*—Heller, Ehrman, White & McAuliffe

[57] ABSTRACT

A bidirectional radio system for low cost, high throughput accumulation of data from a large number of site units. The site units are connected to remote radio transceivers in radio communication with a plurality of base stations. Accurate frequency synchronization allows multiple carriers within a 12.5 kHz FCC bandwidth. Frequency synchronization is achieved at low cost by transmitting a high accuracy carrier and clock signal at a base station, and using receiving circuitry a remote stations to extract the base clock signal and base carrier frequency and a phase-lock loop to stabilize the remote station carriers. The reception circuitry at a remote station provides independent carrier frequency and clock rate recovery, a phase-lock loop at baseband, and a coarse clock rate recovery circuit coupled to a fine clock rate recovery circuit. Remote station responses are time domain multiplexed. A base station receiver can decode a very short remote station response by scaling the response with the phase and amplitude of an initial segment of the response. Spatial reuse of carrier frequencies further increases the rate of data throughput.

17 Claims, 6 Drawing Sheets

FREQUENCY SYNCHRONIZED BIDIRECTIONAL RADIO SYSTEM

BACKGROUND OF THE INVENTION

The present invention relates generally to bidirectional radio communication systems, and more particularly to bidirectional radio communication systems wherein one transceiver transmits frequency reference information to other transceivers, the radio communication system providing load control or utility use monitoring.

In a typical two-way radio communication system, a base station operating on one frequency transmits to a remote station, and the remote station transmits back to the base station on a related frequency. The relationship between the transmission frequencies of the base and remote stations is determined by the licensing rules of the Federal Communications Commission (FCC). For instance, in the Multiple Address System band the base station and remote frequencies are separated by 24 megahertz (MHz).

A dual carrier radio communication system becomes problematic when high through-put communications are required with a large number of stations spread over a large geographic area. One base station transmitter in communication with a number of remote stations will have a through-put determined by the bandwidth efficiency, as measured in bits per second per Hertz. High bandwidth efficiency transceivers are prohibitively expensive in systems which require many remote transceivers. In addition, if one powerful base station is transmitting over a large area there will be regions with poor reception, i.e. dead spots, due to geographic irregularities.

Alternatively, through-put may be increased by transmission of a plurality of carriers within an FCC approved band. This is termed frequency division multiplexing. The cost of this approach is usually in the increased frequency accuracy required of the radio transmitters. Frequency division multiplexing offers the additional advantage that the frequencies can be spatially reused; transmission regions (cells) which utilize the same pair of carrier frequencies are separated by cells which utilize different pairs of carrier frequencies, thereby minimizing interference. The through-put of such systems is equal to the product of the bandwidth efficiency, the number of cells in the system and the bandwidth of the carriers.

Accurate frequency control is conventionally accomplished by using quartz crystal resonators. With careful manufacturing techniques and control of temperature effects, an accuracy of a few parts-per-million is obtainable. Another standard frequency control technique utilizes feedback circuitry. For instance, a transceiver in conjunction with another transceiver with an accurate carrier can generate highly accurate signals utilizing two oscillators. First the signal is heterodyned to an intermediate frequency, then an accurate local oscillator at the intermediate frequency heterodynes the intermediate frequency signal to baseband, where the frequency and phase error of the intermediate frequency can be measured. This error is fed back to the first oscillator to correct its frequency.

With present technology, reduced frequency spacings can only be accomplished by using an outside source for a high stability frequency reference, such as WWV, GPS, or LORAN. The additional cost of including this refined capability in every radio within a system is prohibitive for many applications where low cost of two-way radio communication can bring substantial economic benefits.

An object of the present invention is to provide a high through-put bidirectional radio communications system between at least one base station and a large number of remote stations.

More particularly, an object of the present invention is to provide a low-cost method of generating radio signals at remote stations with a frequency accuracy necessary to provide frequency division multiplexing.

Another object of the present invention is to provide a low-cost method of generating a high accuracy transmission carrier at a remote station utilizing both information contained in the received carrier and information in the modulation of the carrier, particularly the clock rate of the signal.

Another object of the present invention is to provide a radio communications system wherein high data through-put is achieved at low cost by frequency synchronization, frequency division multiplexing, and time division multiplexing.

Another object of the present invention is to provide a receiver for decoding short data bursts from a plurality of transmitters.

Another object of the present invention is to simplify the circuitry of a receiver with clock rate and carrier frequency recovery.

More particularly, an object of this invention is to simplify the circuitry of a receiver with clock rate and carrier frequency recovery by providing a reception circuit which is coupled to the transmission circuit to produce transmission carrier stabilization, by providing independent clock rate and carrier frequency recovery from the received signal, and to provide a phase-lock loop at the baseband rather than the intermediate frequency level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a bidirectional communications systems wherein a base station transceiver transmits signals with a highly precise clock rate over a highly precise carrier frequency, and a remote station transceiver receives the base station signals and extracts the clock rate and carrier frequency information from the received signals. The remote station utilizes the extracted information to stabilize the frequency of the remote station carrier.

The radio system of the present invention provides a high through put bidirectional communications link between a large number, possibly thousands, of remote information gathering stations and a plurality of base stations. The system maximizes data throughput by transmitting over a plurality of carrier frequencies (frequency division multiplexing) within, for example, a 12.5 kilohertz (kHz) FCC bandwidth. The communications region is divided into cells, with one base station per cell and neighboring cells utilizing different carrier frequencies. Each base station transmits a continuous stream of polling signals. The polling signals direct the remote stations within the cell to respond with various types of information. The remote station transmissions are time division multiplexed, i.e. the timing of remote station responses are specified by the polling signals received by the remote stations. The base station is adapted to decode very short bursts of response data transmitted from remote stations.

The present invention produces the frequency accuracy required for frequency division multiplexing while mainly incurring the cost for the improved accuracy at the base stations. This is accomplished by using the combination of the base station carrier frequency and a frequency included in the modulation from the base station, namely the clock rate of the digital signal, to accurately generate the remote station transmitter frequency from the base station transmitter signal.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE PREFERRED EMBODIMENT

Overview

Figure 1:
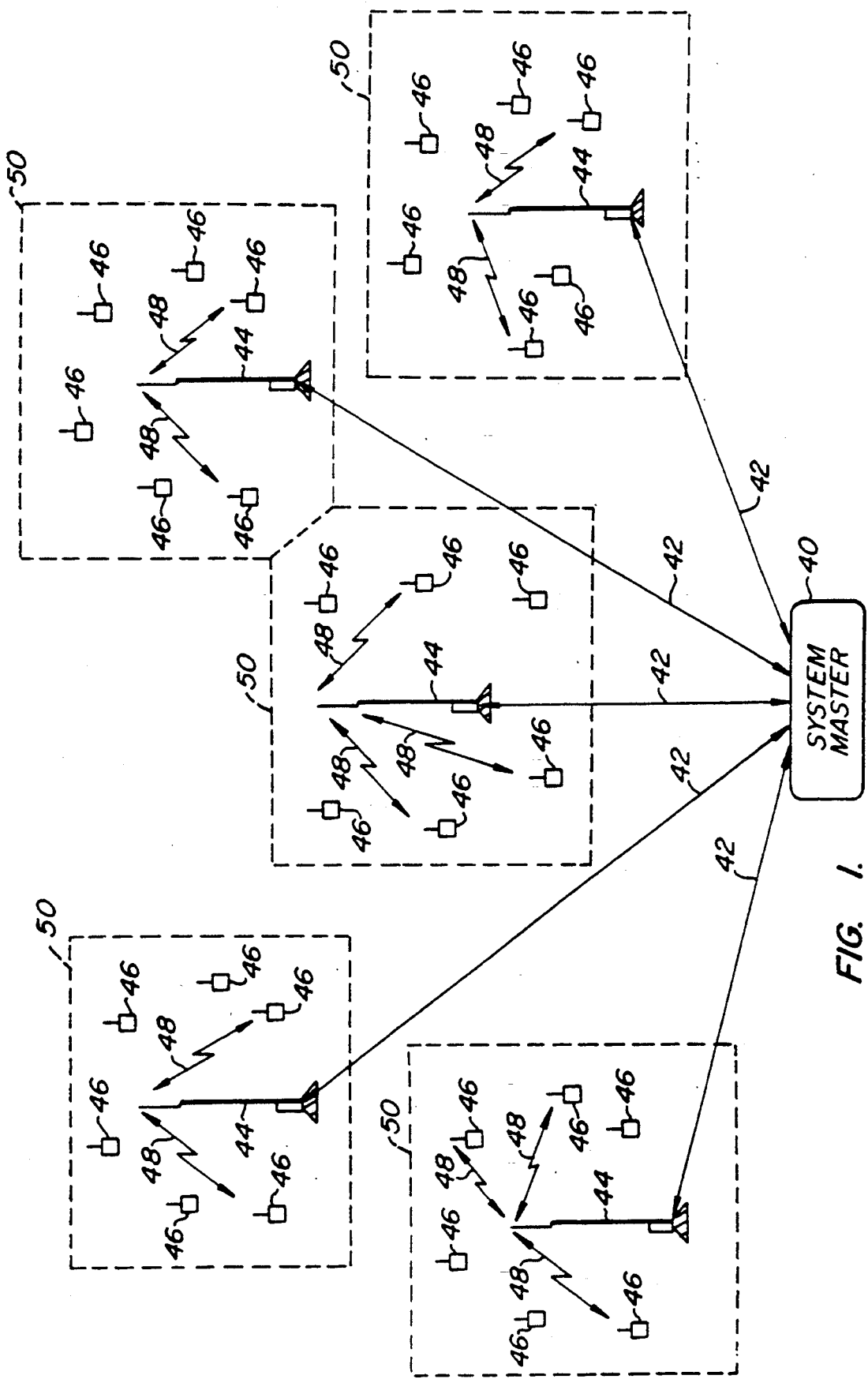
FIG. 1 is an exemplary schematic geographical depiction of the communication system of the present invention.

The present invention will be described in terms of the preferred embodiment. The preferred embodiment is an apparatus and method for frequency synchronized bidirection radio communications. A schematic geographical depiction of the two-way radio system of the present invention is depicted in FIG. 1. The system master 40 is the central control system and information processor. The system master 40 may communicate by telephone lines 42 with a number of base stations 44, collecting information acquired by the base stations 44 and sending polling directions to the base stations 44. The polling directions specify which types of information are to be collected and when. These base stations transmit a continuous radio frequency signal 48 to a number of remote stations 46 in accordance with the polling directions received from the system master 40. The remote stations 46 are possibly extremely densely geographically located. Each remote station 46 communicates with one or more site units (not shown). Site units may, for instance, monitor electrical power consumption of homes, the status of burglar alarms, or control the functions of electrical appliances within homes. Each base station 44, and the group of remote stations 46 with which that base station 44 communicates, comprises a cell 50. The remote stations 46 transmit the information they have collected in short radio communication 'bursts' to the base station 44 within the cell 50 at times specified by the base station 44.

Base station 44/remote station 46 communications consist of two modes. In the fast polling mode, base station transmissions 48 direct remote stations 44 within the cell 50 to inform the base station 44 by radio communication if they have information ready to be transmitted. Once the base station 44 has determined which remote stations 46 have data to be transmitted, the base station transmissions 48 direct those remote stations 46 with information to respond. Each transmission from a base station 44 specifies which remote stations 44 are addressed, what type of information the addressed remote stations 46 are to transmit, how long the addressed remote stations 46 are to wait before transmitting, and how long the remote station 46 response is to be.

The format of the base station 44/remote station 46 communications is described in U.S. Pat. No. 4,972,507, issued Nov. 20, 1990, which is incorporated herein by reference.

To minimize radio interference between cells 50, the base 44 and remote 46 stations of neighboring cells 50 transmit at different frequencies. The larger the number of transmission frequencies utilized in the system, the larger the spacing between cells utilizing the same frequency, and the less the interference between cells.

Figure 2:
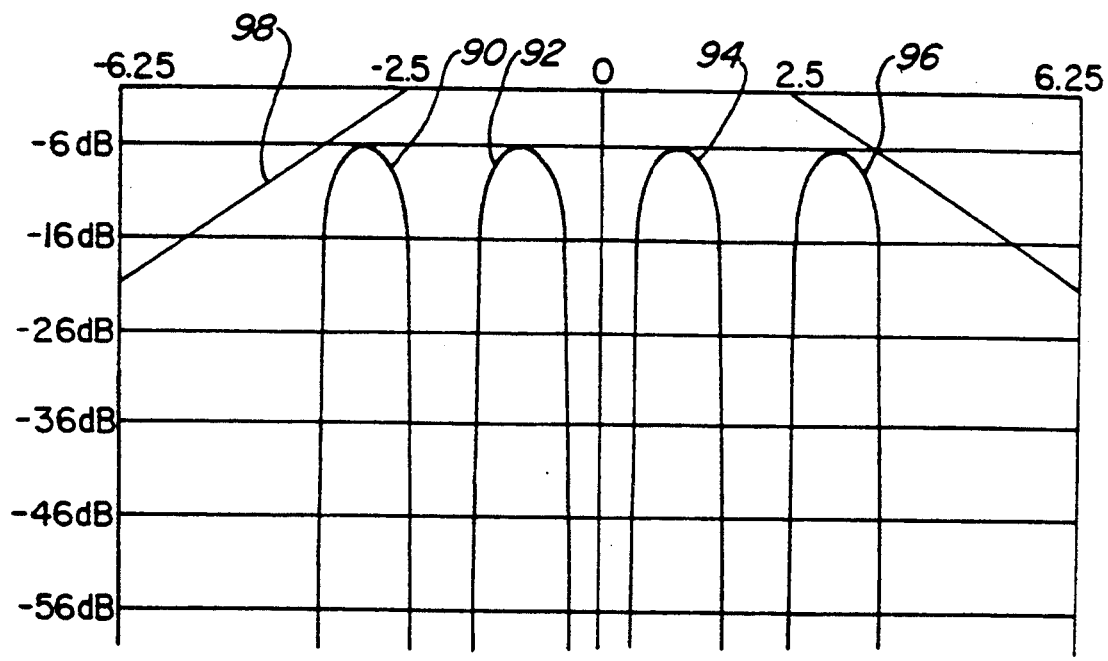
FIG. 2 is a frequency versus power plot of the power spectrum of four carrier frequencies within the 12.5 kHz power spectrum approved by the FCC for radio transmissions.

Because the present invention provides frequency accuracy and stability of the remote station carriers at low cost, the communication system of the present invention utilizes a multiplicity of carrier frequencies which are more closely spaced than those conventionally used. For instance, as shown in FIG. 2, the present embodiment utilizes four carriers 90, 92, 94 and 96 within a 12.5 kHz bandwidth conventionally reserved by the FCC for one carrier. It should be understood that the width of the FCC band and the number of carriers per band can vary, and the 12.5 kHz bandwidth and four carriers discussed herein are only exemplary.

Carriers 92 and 94 are offset by $+/-1041.67$ Hz, and carriers 90 and 96 are offset by $+/-3125$ Hz from the central frequency, and the peak power of each carrier lies 6 decibels (dB) below the permitted maximum (0 dB). As is well known in the art, 9QPR coding of a signal provides a bandwidth efficiency of 2 bits per second per Hertz. In 9QPR encoding data is encoded on both the sine and cosine (or in-phase and quadrature) components of a carrier. See *Digital Transmission Systems*, by David R. Smith, Van Nostrand Reinhold Co., New York, N.Y., 1985, section 6.4, pages 251-254, which describes 9QPR encoding in detail, and is incorporated by reference herein. The frequency spacing of about 2083 Hz between carriers 90, 92, 94, and 96 permits transmission of 2400 bits per second (bps) on each carrier, with guard bands of almost 1000 Hz between bands. The envelope 98 which extends between the points ($-6.25$ kHz, $-10$ dB), ($-2.5$ kHz, 0 dB), (2.5 kHz, 0 dB), and (6.25 kHz, $-10$ dB) describes the power distribution permitted by the FCC for radio signals within a 12.5 kHz bandwidth. Clearly, the sum of the power distribution of these four carriers 90, 92, 94 and 96 falls within the bounds of FCC guidelines.

Base Transceiver Circuitry

Figure 3:
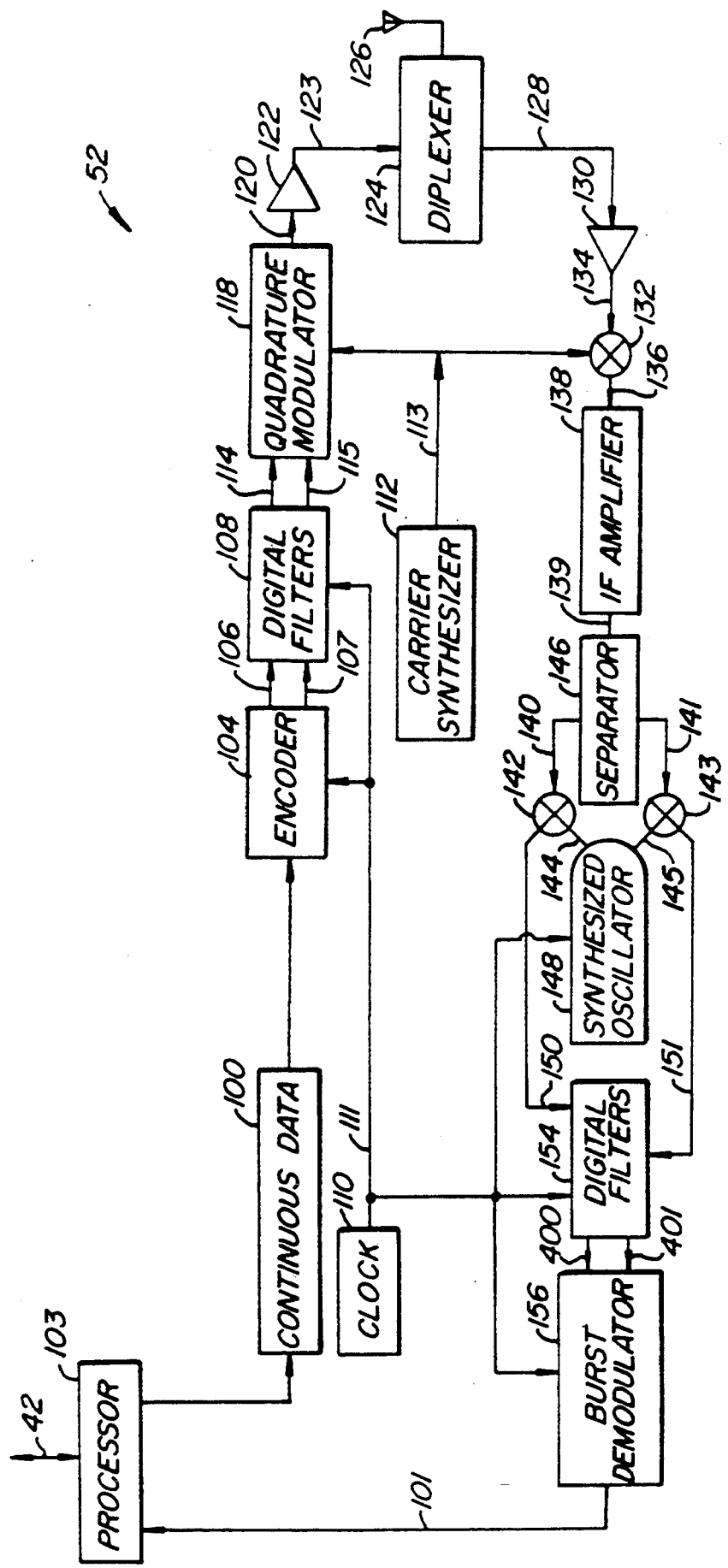
FIG. 3 is a schematic block diagram of the base transceiver circuitry of the present invention.

An embodiment of a base station transceiver 52 of the present invention is shown in FIG. 3. The base station transceiver 52 communicates by radio with the remote station transceivers 46 within the cell 50, and by phone line 42 with the system master 40. The processor 103 of transceiver 52 processes information 101 received from the remote stations 46, as will be described below, and sends it by telephone line 42 to the system master 40. The processor 103 also receives polling directions from the system master 40 by telephone line 42 and translates these directions into a continuous digital data stream 100 which will be transmitted to the remote stations 46, also as described below.

The continuous stream of digital data 100 is sent to an encoder 104 which performs differential encoding on the bit stream to prevent error propagation in the data stream. The even and odd bits of the data stream 100 are separated into two separate data streams 106 and 107 and sent to the digital filters 108. The digital filters 108 perform pulse shaping to reduce the spectral width of the transmitted signal, thereby increasing the bandwidth efficiency of filtered signals 114 and 115. The clock 110 generates a highly precise clock signal 111 which sets the rate of the data flow through the encoder 104 and digital filters 108 at a total of 2400 bps, i.e. 1200 bps for the even and odd bit streams.

The base station 44 has a carrier frequency synthesizer 112 which produces a sinusoidal carrier signal 113 of, for example, 952 MHz from a highly accurate reference frequency source. Present technology allows the generation of a carrier signal 113 with a frequency stability of one part in $10^9$ per day and an accuracy of about five parts in $10^9$. Filtered signals 114 and 115 are sent from the digital filters 108 to a quadrature modulator 118 where the 1200 bps signal 114 is modulated onto the sine component of the carrier signal 113, and the 1200 bps signal 115 is modulated onto the cosine component of the carrier signal 113 to produce a 9QPR modulated signal 120 with a bandwidth efficiency of 2 bps per Hertz. The signal 120 is amplified by the transmission amplifier 122 and the amplified signal 123 is sent to a diplexer 124. The diplexer channels outgoing signals 123 to the antenna 126 for transmission to the remote stations 46, and channels incoming radio communications from the antenna 126, i.e. from the remote stations, to diplexer output 128.

In accordance with FCC specifications for the radio spectrum, multiple access systems are relegated to frequencies near 952 MHz, and transmission/reception frequency pairs are separated by 24 MHz. Incoming signals to the base transceiver 52 at, for instance, 928 MHz are received by the antenna 126, and channeled by the diplexer 124 to diplexer output 128. The diplexer output 128 is amplified by the reception amplifier 130, and sent to a superheterodyning mixer 132. There the signal 134 is heterodyned with the carrier signal 113 generated by the carrier synthesizer 112 to produce an intermediate frequency signal 136 on a 24 MHz carrier.

The 24 MHz signal 136 undergoes selective gain filtering at an intermediate frequency (IF) amplifier 138, and the sine and cosine components 140 and 141 of the IF amplifier output 139 are separated by the separator 146 and heterodyned by heterodynes 142 and 143 with in-phase and quadrature 24 MHz signals 144 and 145 generated by the synthesized oscillator 148. The 24 MHz signals 144 and 145 are generated from the clock signal 111 by the synthesized oscillator 148 which increases the clock frequency by a factor of $10^4$. Heterodynes 142 and 143 output baseband signals 150 and 151. Baseband signals 150 and 151 are then digitally filtered by digital filters 154 and sent to a burst demodulator 156.

The burst demodulator 156 is designed to provide decoding of short bursts of data. In this preferred embodiment the demodulator 158 can handle data transmissions as short as 6 bits (3 symbols) in length. To permit such rapid decoding without a loss of information the first symbol sent by a remote station 46 to the transceiver 52 is a reference symbol of known amplitude and phase.

Figure 6:
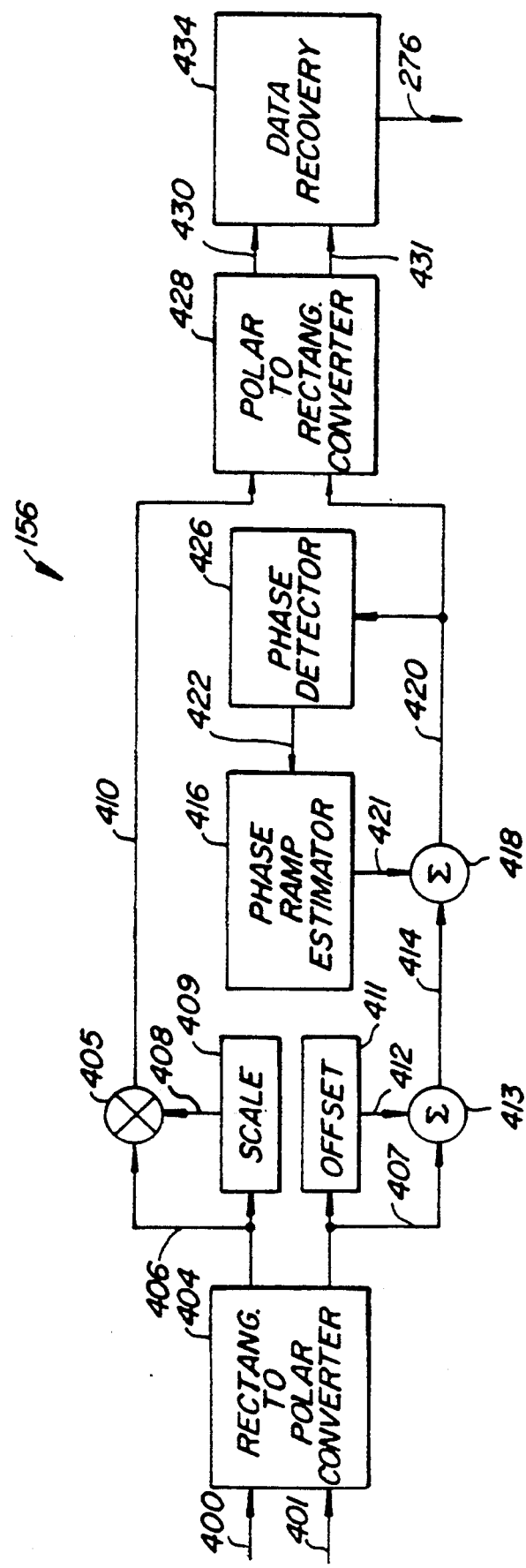
FIG. 6 is a schematic block diagram of the burst data demodulation circuitry of the base transceiver.

The burst demodulator 156 is depicted in greater detail in FIG. 6. The burst demodulator 156 allows for errorless decoding of short data pulses by scaling the phase and amplitude of the signal by the phase and amplitude of an initial reference signal. Quadrature encoded baseband signals 400 and 401 are converted from quadrature (or rectangular) form to polar form at a rectangular to polar converter 404. In polar form the signal has an amplitude component 406 and a phase component 407. During a reference symbol time interval the amplitude and phase of the first symbol are latched by the scale monitor 409 and the offset monitor 411. The amplitude of the first symbol 408 is then sent to the multiplier 405 to scale all subsequent amplitude symbols 406 in the burst. Similarly, the phase of the first symbol 412 is sent to the summing circuit 413 to scale the phase of all subsequent symbols 407 in the burst. This assures that random phases of baseband signals 400 and 401 are compensated for and the data decoding thresholds are properly aligned in scaled outputs 410 and 414.

Since different remote radio 46 carrier frequencies can vary by small amounts, a frequency error compensator in the burst demodulator 156 is also needed. This is implemented by a phase detector 426 which determines the phase of signal 420 and sends a phase information signal 422 to a phase ramp estimator 416. The phase ramp estimator 416 generates a ramp voltage 421 which linearly increases in amplitude with time at a rate proportional to the frequency error superimposed on the baseband signals 400 and 401. The summing circuit 418 sums the phase signal 414 and voltage 421 to scale the phase, thus effectively correcting for any frequency error in output 420. The amplitude and phase signal 410 and 420 are reconverted to rectangular signals 430 and 431 at the polar to rectangular converter 428. Data recovery can then be performed at the data recovery circuit 434 and recovered data 276 is sent to processor 203.

Remote Transceiver Circuitry

Figure 4:
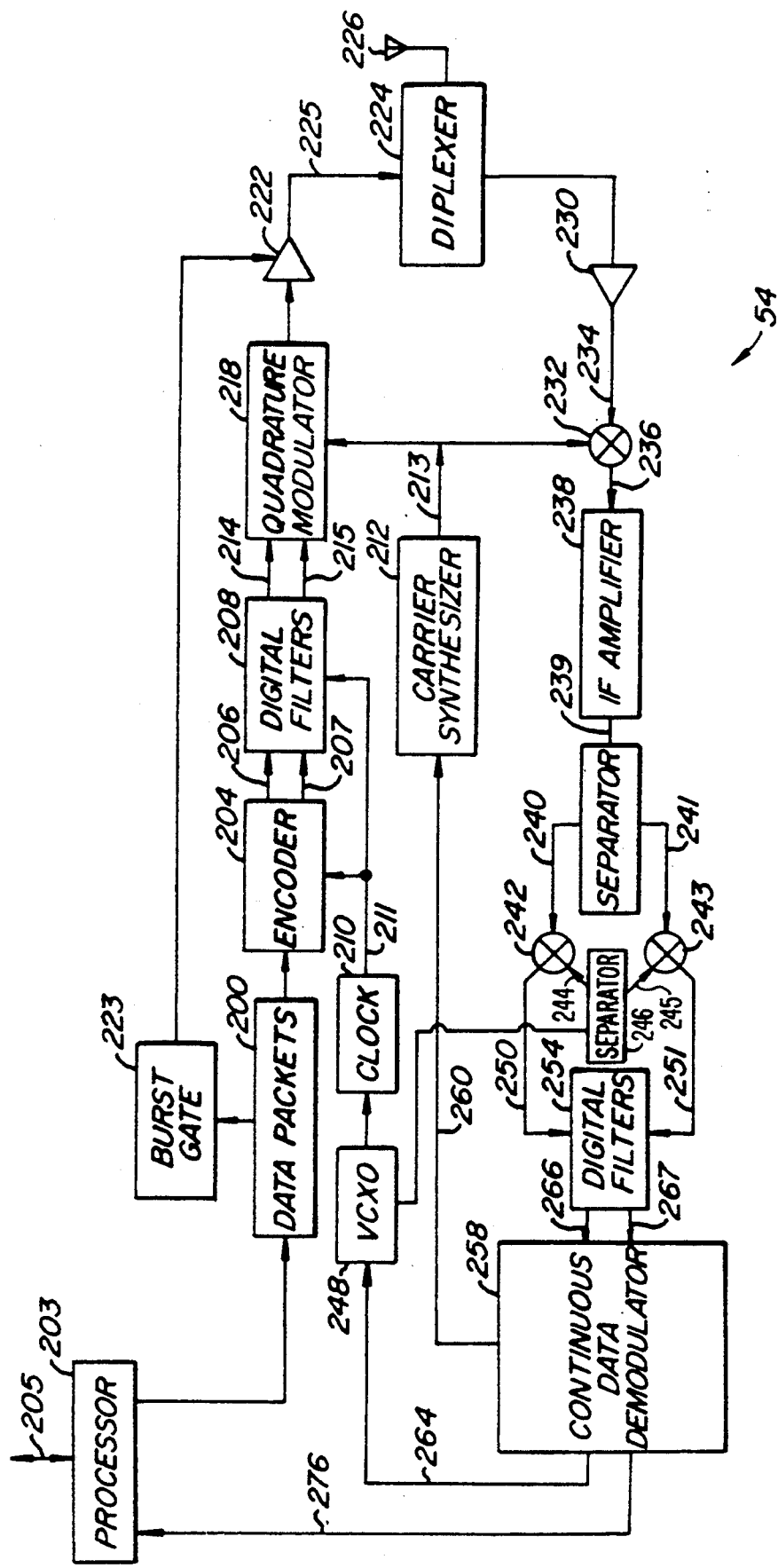
FIG. 4 is a schematic block diagram of the remote transceiver circuitry of the present invention.

The remote transceiver 54 diagrammed in FIG. 4 relays data 205 acquired at site units (not shown) to a base station 44 by radio transmissions. The receiver 54 receives data 205 from site units and processes the information to form data packets 200 from the continuous stream of directions 276 transmitted by a base station 44, as described below. Data packets 200 are first sent to an encoder 204. As in the encoder 104 of the base station transceiver 52, this encoder 204 separates the data packets 200 into odd and even bits and performs differential encoding on the data streams. The resulting even and odd data streams 206 and 207, respectively, are sent through digital filters 208 to shape the spectrum of the signals. A clock signal 211 from clock 210 controls the rate of processing of encoder 204 and digital filters 208.

The even and odd data streams 214 and 215 from the digital filters 208 are then modulated by a quadrature modulator 218 to produce a 9QPR signal on carrier 213 generated by a carrier synthesizer 212. Through the feedback mechanism described below, the synthesizer 212 has a precisely controlled frequency of, in this case, 928 MHz. A transmitting amplifier 222 is activated by a burst gate 223 when the remote station 46 is transmitting data to a base station 44. The amplified signal 225 from amplifier 222 is directed through a diplexer 224 to an antenna 226 for transmission to base station 44.

Incoming signals from base station 44 are received by antenna 226, and channeled by the diplexer 224 to a reception amplifier 230 and heterodyned at a superheterodyning mixer 232 with the locally generated carrier 213 to convert the incoming signal 234 to an intermediate frequency signal 236. Given that the reception frequency is 952 MHz and assuming the carrier 213 output from the synthesizer 212 is exactly 928 MHz, the carrier of the intermediate frequency signal 236 is at 24 MHz. But any error in the output 213 of the synthesizer 212 causes a deviation in the frequency of the intermediate frequency signal 236 from 24 MHz.

The intermediate frequency signal 236 is then amplified further by an intermediate frequency (IF) amplifier 238. In-phase and quadrature components 240 and 241 are separated from the amplified intermediate frequency signal 239 by the separator 246, and are heterodyned by mixers 242 and 243 with in-phase and quadrature 24 MHz signals 244 and 245 generated by a voltage controlled crystal oscillator (VCXO) 248 to produce baseband signals 250 and 251. The signals 250 and 251 are then directed to the digital filters 254 which digitally process the signals 250 and 251 to provide better band pulse shaping and out-of-band signal rejection to produced filtered baseband signals 266 and 267. Data recovery from the filtered baseband signals 266 and 267 is performed by the continuous data demodulator 258. It should be noted that although signals 266 and 267 have undergone digital processing at digital filter 254, the signals 266 and 267 are still essentially analog.

Ideally, the intermediate frequency signal 236 is modulated on a carrier of exactly 24 MHz and the VCXO 248 generates sinusoids 244 and 245 at exactly 24 MHz, and therefore the baseband signals 250 and 251 have a zero frequency carrier. The frequency and phase of the baseband signals 250 and 251, and thereby the frequency and phase errors of the carrier synthesizer 212 or VCXO 248, are measured by the continuous data demodulator 258 using either conventional digital radio receiver techniques, or the carrier recovery technique described below. Frequency error information 260 is fed back to the carrier synthesizer 212 to correct its frequency so as to minimize the aforementioned error, thereby effecting a phase-locked loop circuit.

For high accuracy of the carrier 213 from carrier synthesizer 212, it is necessary that the signals 244 and 245 from the VCXO 248 also be accurate, because any error in the outputs 244 and 245 from the VCXO 248 is indistinguishable to the continuous data demodulator 258 from an error in the frequency of the remote carrier synthesizer 212.

The 24 MHz signals 244 and 245 from the VCXO 248 are synthesized from the recovered 2400 Hz clock signal 264 generated by the continuous data demodulator 258. Because the clock signal 111 generated at the base station transmitter 44 has a high accuracy, the 24 signals 244 and 245 at the remote radio 46 also has a high accuracy. Then the frequency error signal 260 generated by the continuous data demodulator 258 is an accurate representation of the carrier frequency synthesizer 212 error, and correcting this error puts the carrier frequency synthesizer 212 accurately on frequency.

Figure 5:
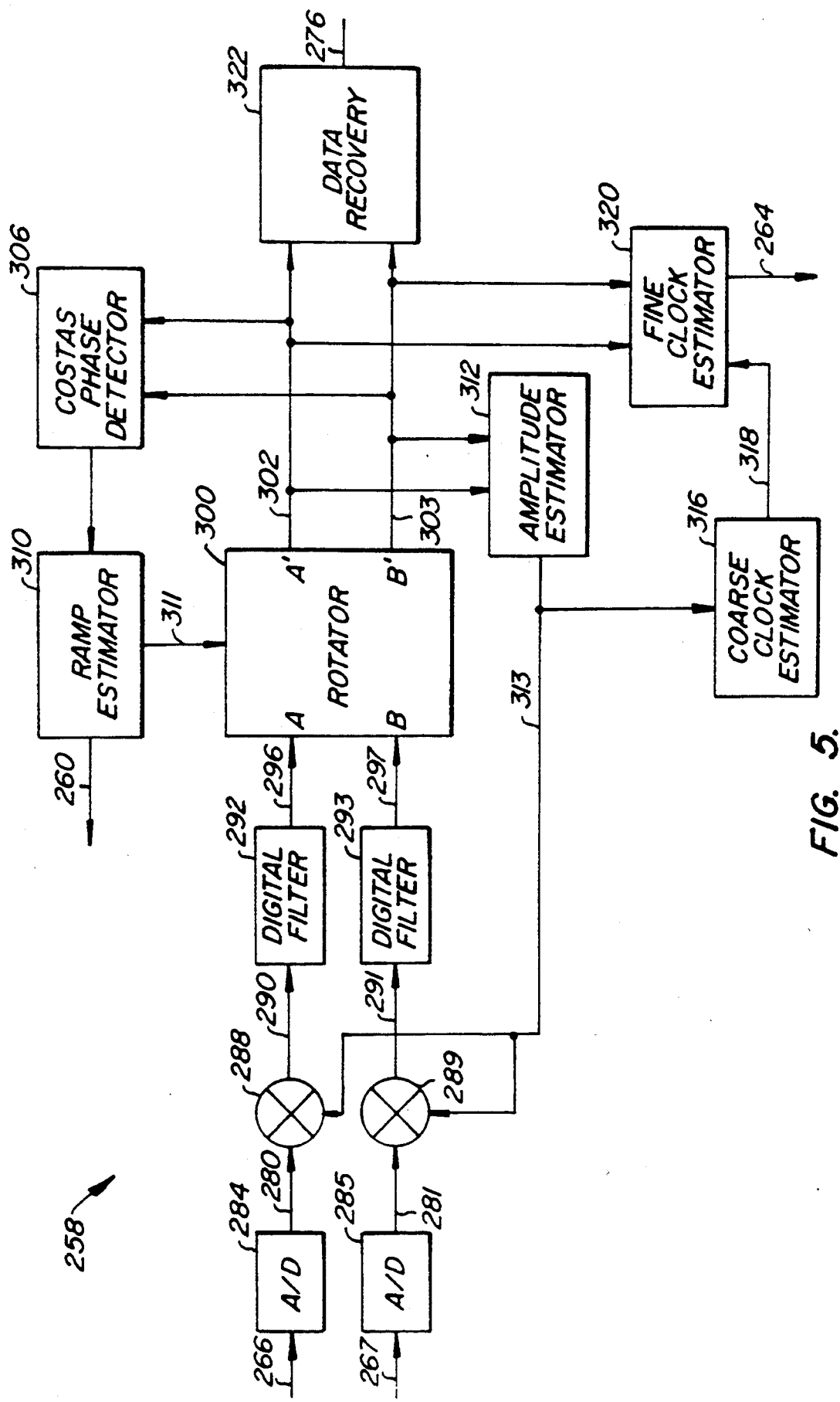
FIG. 5 is a schematic block diagram of the continuous data demodulation circuitry of the remote transceiver.

The continuous data demodulator circuit 258 is shown in detail in FIG. 5. Signals 266 and 267 from digital filters 254 are converted to digital at the two A/D converters 284 and 285, and the resulting digital signals 280 and 281 are scaled by two multipliers 288 and 289 to produce amplified signals 290 and 291. Signals 290 and 291 are digitally filtered at digital filters 292 and 293 to reject out-of-band interference. The filtered signals 296 and 297 are sent to inputs A and B, respectively, of a rotator 300. The rotator 300 determines the amount spurious mixing of in-phase and quadrature components in signals 296 and 297 and reverses this mixing. The outputs A' and B' of the rotator 300 consist of the mixtures:

$$A' = A \cos \phi + B \sin \phi,$$

and $$B' = -A \sin \phi + B \cos \phi,$$

where $\phi$ is the rotation angle. A Costas phase detector 306 determines the amount of quadrature signal in signal 302 (or equivalently, the amount of in-phase signal in signal 303). Ramp estimator 310 generates a control signal 311 which sets the amount of rotation $\phi$ performed by the rotator 300 such that signals 302 and 303 become the in-phase and quadrature components, respectively, of the transmission. The ramp estimator also generates the frequency error signal 260 which is directed to the carrier synthesizer 212 (see FIG. 4) to stabilize the carrier frequency 213.

The continuous data demodulator 258 utilizes an automatic gain control algorithm to maintain a constant signal level over 24 dB of signal level variations. The amplitude estimator 312 calculates the sum of the squares of signals 302 and 303 from the rotator 300 to generate amplitude estimate 313. The magnitude of the estimate 313 is directed to inverse gain controls of multipliers 288 and 289, thereby stabilizing the amplitude of signals 290 and 291.

A preliminary estimate of the clock phase of signals 302 and 303 is achieved by squaring signal 313 at a coarse clock estimator 316. The output 318 of estimator 316 can be shown to exhibit a peak at the data sample times that have the proper clock phase, and can therefore be used as a coarse estimate of the clock signal 111. A finer estimate of the clock frequency and phase is attained at a fine clock estimator 320 by processing the magnitude of the signals 302 and 303 at the nominal zero crossing times estimated by the coarse clock estimator 316. This generates an error signal 264 which can be used to tune the VCXO 248 thereby putting it accurately on 24 MHz. Since the calculation of the clock phase is independent of the carrier phase and frequency, clock synchronization can be achieved before carrier frequency synchronization is attained. Decoding of signals 302 and 303 is performed at a data recovery circuit 322 to produce recovered data 276. Recovered data 276 is directed to the remote station processor 203 as shown in FIG. 4. The recovered data 276 specifies what information the remote station 46 is to collect from the site units, or transmit to the base station 44.

In summary, an apparatus for frequency synchronized bidirectional radio system has been described. It will be seen that the embodiment presented herein, consistent with the objects of the invention for a frequency synchronized bidirectional radio system, provide a low cost high through-put radio system utilizing frequency domain multiplexing, time domain multiplexing, frequency synchronization and spatial reuse of frequencies. The frequency synchronization of remote stations 46 is provided by extracting the precise clock rate 111 and carrier frequency 113 of the base station 44 and utilizing this information in phase-lock loop circuitry.

While the above description contains many specificities, these should not be construed as limitations on the scope of the invention, but rather as exemplifications of preferred embodiment thereof. Many variations are possible. For example, communications between the system master 40 and the base stations 44 could be by radio communications, more or less than four carriers could be allotted per 12.5 kHz bandwidth, the circuitry of the base station 44 and remote station 46 transceivers could utilize other encoding, filtering and modulation techniques, and the polling formats could take many other forms. Also, the carrier error signal 260 could instead be sent to a rotator inserted on the transmission side of the transceiver, rather than to the carrier synthesizer 212, to effect phase and frequency correction by adding a phase shift to the signal rather than the carrier. The modulation of the carriers 113 and 213 is not necessarily 9QPR, quadrature modulation, or digital modulation, but may be any type of modulation.

The present invention has been described in terms of a preferred embodiment. The invention, however, is not limited to the embodiment depicted and described. Rather, the scope of the invention is defined by the appended claims.

What is claimed is:

1. A bidirectional communication system comprising at least one communication cell having a base station and at least one remote station, in said cell said remote station receiving polling signals from said base station at a precise base clock rate on a precise base carrier frequency, in said cell said remote station transmitting response signals at a remote clock rate to said base station on a remote carrier frequency, said base clock rate being extracted at said remote station from said polling signals to generate said remote clock rate in synchronization with said base clock rate, said remote station calculating frequency error information relating to a difference in frequency between said precise base carrier frequency and said remote carrier frequency, and both said frequency error information and said remote clock rate being utilized in phase-lock loop circuitry in said remote station to stabilize said remote carrier frequency.

2. The communication system of claim 1 wherein an initial segment of a burst of data received by said base station from said remote station is used to scale a phase and an amplitude of a remainder of the burst.

3. The system of claim 1 or 2 wherein said polling signals are quadrature encoded and further comprising an apparatus for decoding in-phase and quadrature components of said polling signals at said remote station, said polling signals having a first component and a second component, said first component being an estimated in-phase component and said second component being an estimated quadrature component, said apparatus being comprised of:

a) a rotator, said rotator generating a first rotated component and a second rotated component from said first component and said second component in response to a rotation signal;

b) a phase detector, said phase detector detecting an amount of in-phase component and quadrature components in said first component and second component and generating a ramp control signal; and c) a ramp estimator, said ramp estimator reading said ramp control signal and generating said rotation signal such that said first and second rotated components are substantially equivalent to the in-phase and quadrature components of said polling signal, and said ramp estimator generating said frequency error information.

4. The system of claim 3, further comprising:

a coarse clock estimator, said coarse clock estimator generating a sequence of coarse clock pulses from said first and second rotated components; and a fine clock timing error estimator, said fine clock timing error estimator sampling said coarse clock pulses to produce remote clock timing error information from values of said first and second rotated components, said remote clock timing error information being utilized in phase-lock loop circuitry in said remote station to stabilize said remote clock rate.

5. The system of claim 4, further comprising: an amplitude estimator, said amplitude estimator generating an amplitude estimate from a sum of squares of said first and second rotated components, and first and second multipliers, said first and second multipliers scaling said first and second components, respectively, by an amount inversely related to said amplitude estimate.

6. The system of claim 1 or 2, further comprising an apparatus for extracting a clock signal from a signal having a first and a second rotated component, said apparatus comprising:

a coarse clock estimator, said coarse clock estimator generating a sequence of coarse clock pulses from said first and second rotated components; and a fine clock timing error estimator, said fine clock timing error estimator sampling said coarse clock pulses to produce remote clock timing error information from values of said first and second rotated components, said timing error information being utilized in phase-lock loop circuitry in said remote station to stabilize said remote clock rate.

7. The system of claim 6 wherein said polling signals are quadrature encoded, and further comprising an apparatus for decoding in-phase and quadrature components of said polling signal at said remote station, said polling signal having a first component and a second component, said first component being an estimated in-phase component and said second component being an estimated quadrature component, said apparatus being comprised of:

a) a rotator, said rotator generating said first rotated component and said second rotated component from said first component and said second component in response to a rotation signal;

b) a phase detector, said phase detector detecting an amount of in-phase component and quadrature components in said first component and second component and generating a ramp control signal; and c) a ramp estimator, said ramp estimator reading said ramp control signal and generating said rotation signal such that said first and second rotated components are substantially equivalent to the in-phase and quadrature components of said polling signal, and said ramp estimator generating base carrier frequency information.

8. The system of claim 7, further comprising: an amplitude estimator, said amplitude estimator generating an amplitude estimate from a sum of squares of said first and second rotated components, and first and second multipliers, said first and second multipliers scaling said first and second components, respectively, by an amount inversely related to said amplitude estimate.

9. A bidirectional radio communication system comprised of at least one communication cell, said cell having a base station and at least one remote station, said remote station receiving a polling signal at a precise base clock rate on a precise base carrier frequency from said base station, said remote station transmitting response signals at a remote clock rate to said base station on a remote carrier frequency, said remote station being comprised of:

a first frequency synthesizer generating said remote carrier frequency, said remote carrier frequency being stabilized by a first stabilization signal directed to said first synthesizer;

a first frequency heterodyne, said first heterodyne heterodyning said remote carrier frequency and polling signal received from said base station to generate an intermediate frequency signal;

a second frequency synthesizer generating an intermediate frequency sinusoid, said intermediate frequency sinusoid being stabilized by a second frequency stabilization signal;

a second frequency heterodyne, said second heterodyne heterodyning said intermediate frequency sinusoid and said intermediate frequency signal to generate a baseband signal;

a first recovery circuit, said first recovery circuit recovering carrier frequency error information from said baseband signal and generating said first frequency stabilization signal; and a second recovery circuit, said second recovery circuit generating said second frequency stabilization signal from said baseband signal, and synchronizing said remote clock rate and said precise base clock rate.

10. An apparatus for decoding in-phase and quadrature components of a quadrature encoded signal, said quadrature encoded signal having a first component and a second component, said first component being an estimated in-phase component add raid second component being an estimated quadrature component, said apparatus being comprised of:

a) a rotator, said rotator generating a first rotated component and a second rotated component from said first component and said second component in response to a rotation signal;

b) a phase detector, said phase detector detecting an amount of in-phase component and quadrature components in said first component and said second component and generating a ramp control signal;

c) a ramp estimator, said ramp estimator reading said ramp control signal and generating said rotation signal such that said first and second rotated components are substantially equivalent to the in-phase and quadrature components of said quadrature encoded signal;

d) a coarse clock estimator, said coarse clock estimator generating a sequence of coarse clock pulses from said first and second rotated components; and e) a fine clock timing error estimator sampling said coarse clock pulses to produce clock timing error information from values of said first and second rotated components, said timing error information being utilized in phase-lock loop circuitry to stabilize said clock pulses.

11. The apparatus of claim 10, further comprising:
an amplitude estimator generating an amplitude estimate from a sum of squares of said first and second rotated components, and first and second multipliers, said first and second multipliers scaling said first and second components, respectively, by an amount inversely proportional to said amplitude estimate.

12. The apparatus of claim 11 wherein said coarse clock estimator generates said coarse clock pulses from a square of a sum of squares of said first and second rotated components.

13. An apparatus for extracting a clock timing error signal from a quadrature encoded signal, said quadrature encoded signal having a first rotated component and a second rotated component, said apparatus comprising:

a coarse clock estimator, said coarse clock estimator generating a sequence of coarse clock pulses from a square of sum of squares of said first and second rotated components; and a fine clock timing error estimator, said coarse clock pulses being fed to said fine clock timing error estimator from said coarse clock estimator, said fine clock timing error estimator sampling said first and second rotated component at times corresponding to said coarse clock pulses to produce said clock timing error signal.

14. The apparatus of claim 13, further comprising a decoding apparatus for decoding in-phase and quadrature components of a quadrature encoded signal, said quadrature encoded signal having a first component and a second component, said first component being an estimated in-phase component and said second component being an estimated quadrature component, said decoding apparatus being comprised of:

a) a rotator, said rotator generating said first rotated component and said second rotated component from said first component and said second component in response to a rotation signal;

b) a phase detector, said phase detector detecting an amount of in-phase component and quadrature components in said first component and said second component and generating a ramp control signal; and c) a ramp estimator, said ramp estimator reading said ramp control signal and generating said rotation signal such that said first and second rotated components are substantially equivalent to the in-phase and quadrature components of said quadrature encoded signal.

15. The apparatus of claim 14, further comprising:
an amplitude estimator generating an amplitude estimate from a sum of squares of said first and second rotated components, and first and second multipliers, said first and second multipliers scaling said first and second components, respectively, by an amount inversely proportional to said amplitude estimate.

16. The apparatus of claim 16 wherein said coarse clock estimator generates said coarse clock pulses from a square of a sum of squares of said first and second rotated components.

17. A method of decoding a short burst of data from quadrature demodulated components of a signal comprising the steps of: calculating an amplitude and phase of a predetermined reference segment of said short burst to generate a scaling amplitude and a scaling phase, using said scaling amplitude to scale an amplitude of a remainder segment of said short burst and said scaling phase to scale a phase of a remainder segment of said short burst to provide a scaled remainder signal, and demodulating data from said scaled remainder signal.

* * * * *

UNITED STATES PATENT AND TRADEMARK OFFICE
CERTIFICATE OF CORRECTION

```
PATENT NO.   : 5,377,232
DATED        : December 27, 1994
INVENTOR(S)  : M. Davidov, et al.
```

It is certified that error appears in the above-identified patent and that said Letters Patent is hereby corrected as shown below:

```
Column 13:
In claim 16, first line thereof, replace "16" with --15--.
```

Signed and Sealed this

Thirteenth Day of May, 1997

*Attest:*

BRUCE LEHMAN

*Attesting Officer*            *Commissioner of Patents and Trademarks*